US010806550B2

(12) United States Patent
Lyu et al.

(10) Patent No.: US 10,806,550 B2
(45) Date of Patent: Oct. 20, 2020

(54) APPARATUS AND METHOD FOR MANUFACTURING DENTAL RESTORATION

(71) Applicant: METAL INDUSTRIES RESEARCH & DEVELOPMENT CENTRE, Kaohsiung (TW)

(72) Inventors: Yu-Ting Lyu, Kaohsiung (TW); Yen-Ting Chen, Kaohsiung (TW); Po-Chi Hu, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 99 days.

(21) Appl. No.: 16/199,254

(22) Filed: Nov. 26, 2018

(65) Prior Publication Data
US 2019/0159876 A1     May 30, 2019

(30) Foreign Application Priority Data

Nov. 28, 2017   (TW) .............................. 106141428 A

(51) Int. Cl.
| | |
|---|---|
| *A61C 13/00* | (2006.01) |
| *B23K 26/12* | (2014.01) |
| *A61C 13/08* | (2006.01) |
| *B33Y 80/00* | (2015.01) |
| *B33Y 30/00* | (2015.01) |
| *B29C 64/153* | (2017.01) |

(Continued)

(52) U.S. Cl.
CPC ...... *A61C 13/0018* (2013.01); *A61C 13/0019* (2013.01); *A61C 13/08* (2013.01); *B23K 26/12* (2013.01); *B29C 64/153* (2017.08); *B29C 64/268* (2017.08); *B33Y 10/00* (2014.12); *B33Y 30/00* (2014.12); *B33Y 80/00* (2014.12); *A61C 5/77* (2017.02); *G05B 2219/45165* (2013.01); *G05B 2219/45167* (2013.01); *G05B 2219/49328* (2013.01)

(58) Field of Classification Search
CPC . A61C 13/0018; A61C 13/0019; A61C 13/08; A61C 5/77; B33Y 80/00; B33Y 30/00; B33Y 10/00; B29C 64/153; B29C 64/268; B23K 26/12; G05B 2219/49328; G05B 2219/45165; G05B 2219/45167
See application file for complete search history.

(56) References Cited

U.S. PATENT DOCUMENTS

| | | | | |
|---|---|---|---|---|
| 4,027,137 A | * | 5/1977 | Liedtke ................ | B23K 26/123 219/121.7 |
| 8,097,825 B2 | * | 1/2012 | Sato ................... | B23K 35/0244 219/64 |

(Continued)

*Primary Examiner* — Nahida Sultana
(74) *Attorney, Agent, or Firm* — CKC & Partners Co., LLC

(57) ABSTRACT

The present invention provides an apparatus for manufacturing a dental restoration. The apparatus includes a first laser module, a powder supplying nozzle, a second laser module, a dust cleaning device and an air bearing device for holding the dental restoration. The second laser module includes a plurality of laser sources, and the laser sources disposed circumferentially around the first laser module, in which each laser source is equally spaced apart from one another. The present invention further provides a method for manufacturing the dental restoration, in which the method can be applied to a laser cladding process or a laser milling process.

4 Claims, 4 Drawing Sheets

(51) Int. Cl.
  *B29C 64/268* (2017.01)
  *B33Y 10/00* (2015.01)
  *A61C 5/77* (2017.01)

(56) References Cited

U.S. PATENT DOCUMENTS

| | | | | |
|---|---|---|---|---|
| 8,302,305 | B2* | 11/2012 | Kawasaki | B23K 26/32 |
| | | | | 29/888.44 |
| 10,399,181 | B2* | 9/2019 | Yanaka | B23K 26/144 |
| 2001/0008230 | A1* | 7/2001 | Keicher | B33Y 40/00 |
| | | | | 219/121.63 |
| 2015/0034604 | A1* | 2/2015 | Subramanian | B22F 7/06 |
| | | | | 219/73.21 |
| 2019/0047088 | A1* | 2/2019 | Riemann | B23K 26/1464 |

* cited by examiner

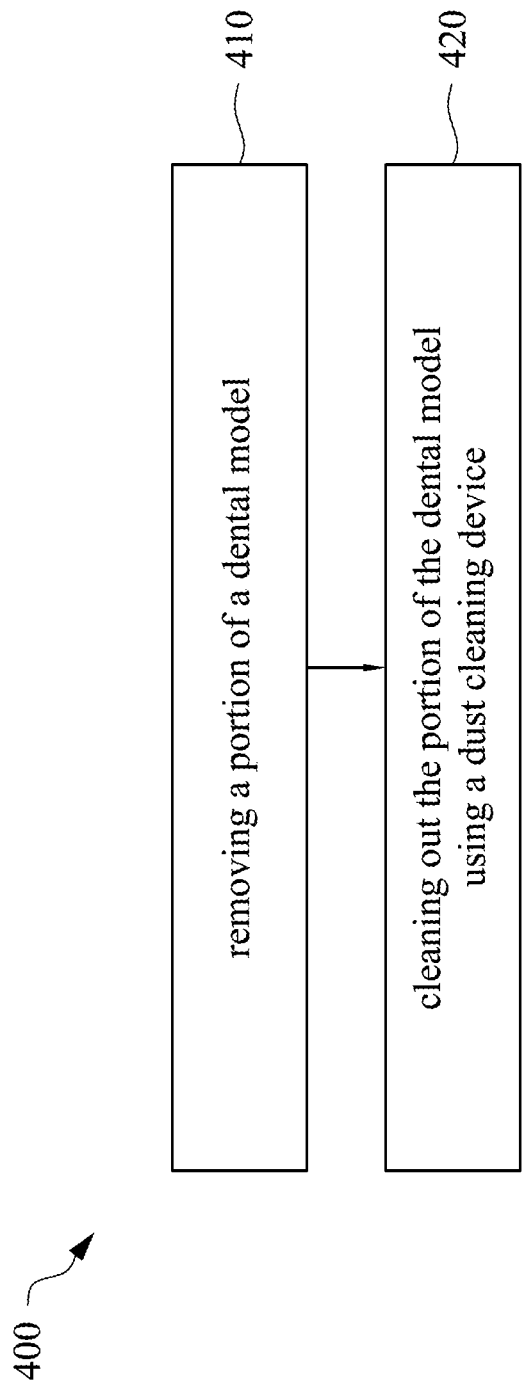

APPARATUS AND METHOD FOR MANUFACTURING DENTAL RESTORATION

RELATED APPLICATIONS

This application claims priority to Taiwan Application Serial Number 106141428, filed Nov. 28, 2017, which is herein incorporated by reference.

BACKGROUND

Field of Invention

The present invention relates to an apparatus and a method for manufacturing a dental restoration. More particularly, the present invention relates to a device that may perform two processes for manufacturing the dental restoration in the same device, and a method that the two processes are performed for manufacturing the dental restoration using a laser.

Description of Related Art

A common apparatus for processing a dental restoration usually performs a traditional milling process. Cutting oil, water and the like are required in such milling process, and thus the dental restoration cannot be directly manufactured in a dental clinic because of the requirement of cleanness in the dental clinic. As a result, a course of a treatment using the dental restoration is usually separated into several times, which make patients inconvenient.

With the development of three dimensional (3D) printing techniques and the laser-assisted process, the dental restoration may be manufactured by a laser cladding process and a laser milling process. In the laser cladding process, an addition process is performed on a dental model by injecting the powder of the dental restoration, followed by melting and solidifying the powder on the dental model. However, the powder is wasted because the powder easily spatters in the process. Furthermore, the powder is usually stuck in the device of the laser-assisted process (e.g. a holding platform), causing that the laser-assisted process is interrupted.

In addition, the laser cladding process and the laser milling process are performed by difference devices, such that process flexibility is insufficient.

Accordingly, an apparatus for manufacturing the dental restoration is required, such that the laser cladding process and the laser milling process are able to be performed by the same device, and the drawbacks of the common process may be improved.

SUMMARY

Accordingly, an aspect of the present invention is to provide an apparatus for manufacturing a dental restoration. The powder of the dental restoration that spatters out of the apparatus may be reduced, such that the powder is efficiently used. In addition, the device is applicable to perform both the laser cladding process and the laser milling process.

The other aspect of the present invention is to provide a method for manufacturing the dental restoration. The method is performed by the device described above. The method includes the laser cladding process and the laser milling process.

In accordance with the aspects of the present invention, an apparatus for manufacturing the dental restoration is provided. In one embodiment, the apparatus includes a first laser module, a powder supplying nozzle, a second laser module, a dust cleaning device and an air bearing device for holding a dental restoration. The first laser module includes a first laser source. The powder supplying nozzle includes a channel and at least one powder injection passage both of which are disposed in the powder supplying nozzle. The at least one powder injection passage is adjacent to the channel. The channel is configured such that a laser beam emitted by the first laser source passes through the channel. The second laser module includes plural second laser sources disposed circumferentially around an outer sidewall of the powder supplying nozzle. The dust cleaning device includes a dust suction hood and an evacuation device, in which the first laser module, the powder supplying nozzle and the second laser module are disposed in the dust suction hood, and the evacuation device is connected to the dust suction hood. The first laser module and the second laser module are disposed over the air bearing device.

According to some embodiments of the present invention, the air bearing device includes a linear motion platform having a first surface, a first rotary element, a second rotary element, a platform for holding the dental restoration, a gas supplying device and a driving device. The first rotary element includes a first rotary shaft and a first rotary shaft bearing. The first rotary shaft is connected to the linear motion platform, the first surface is parallel to an extending direction of the first rotary shaft, and the first rotary shaft extends through the first rotary shaft bearing. The second rotary element includes a second rotary shaft and a second rotary shaft bearing. The second rotary shaft is disposed on the first surface of the linear motion platform, and the second rotary shaft extends through the second rotary shaft bearing. The platform for holding the dental restoration is disposed on the second rotary element. The platform includes a second surface, and the second surface is parallel to the extending direction. The gas supplying device is connected to the linear motion platform, the first rotary shaft bearing and the second rotary shaft bearing. The driving device is connected to the liner motion platform, the first rotary shaft bearing and the second rotary shaft bearing, so as to drive the air bearing device to undergo a rotational motion and/or a linear motion.

According to some embodiments of the present invention, the powder injection passage is connected to a powder supplying device.

According to some embodiments of the present invention, a power of the first laser source is greater than a power of the second laser sources.

In accordance with the aspects of the present invention, a method for manufacturing the dental restoration is provided. In some embodiments, the method is performed by the apparatus for manufacturing the dental restoration. The method includes the following steps. First, a dental model is provided on the platform for holding the dental restoration. Next, a process of laser machining is performed on the dental model, in which the process includes a laser cladding process or a laser milling process. Then, the laser cladding process and the laser milling process may be respectively performed. In an example where the laser cladding process is performed, a dental restoration powder is then introduced from the powder injection passage. Thereafter, a portion of the dental restoration powder is melted using the first laser source, such that the portion of the dental restoration powder is solidified on the dental model. A remaining portion of the dental restoration powder is melted using the second laser sources, such that the remaining portion of the dental restoration powder is solidified on the dental model. In an example where the laser milling process is performed, a portion of the dental model is removed using the first laser source. Then, the portion of the dental model is cleaned out using the dust cleaning device.

According to one embodiments of the present invention, when the process of the laser machining is performed, the method further includes moving and/or rotating the dental model using the platform.

According to one embodiments of the present invention, when the laser milling process is performed, the method further includes turning off the second laser sources.

Applying the device and the method for manufacturing the dental restoration of the present invention, the same device can selectively perform the laser cladding process or the laser milling process. When the device is used to perform the laser cladding process, the dental restoration powder that spatters out of the apparatus can be reduced, and the dental restoration powder can be efficiently used. Oil and water are not required in the process, and the process also has advantages such as less noise and rapidness. When the device is used to perform the laser milling process, the spattering of the removed portion of the dental model can be reduced, such that the work of the air bearing device may not be interrupted.

BRIEF DESCRIPTION OF THE DRAWINGS

The invention can be more fully understood by reading the following detailed description of the embodiment, with reference made to the accompanying drawings as follows:

FIG. 4 is a flow chart showing a laser milling process in accordance with some embodiments of the present disclosure.

DETAILED DESCRIPTION

A purpose of the present invention is directed to providing an apparatus and a method of manufacturing a dental restoration. In the apparatus, a configuration of an existed apparatus for manufacturing the dental restoration is modified, so as to arrange additional laser sources and a suction hood around an existed laser source. The modified apparatus can perform both a laser cladding process and a laser milling process. In addition, the modification of the configuration of the apparatus can reduce a powder of the dental restoration during the laser cladding process, thereby eliminating an amount of the wasted powder that spatters out of the apparatus. Furthermore, the modification may also reduce the spattering of a removed portion of a dental model during the laser milling process.

The term of the dental model of the present invention represents an initial material that has not been processed or machined.

The term of the dental restoration of the present invention represents products such as an artificial tooth, a tooth wear (a dental crown) which has been processed or machined.

The term that the apparatus can perform both the laser cladding process and the laser milling process represents that one of the laser cladding process and the laser milling process can be selected and performed without changing elements of the apparatus. That is, the embodiments of the present invention are not limited to performing these two processes simultaneously.

Figure 1:
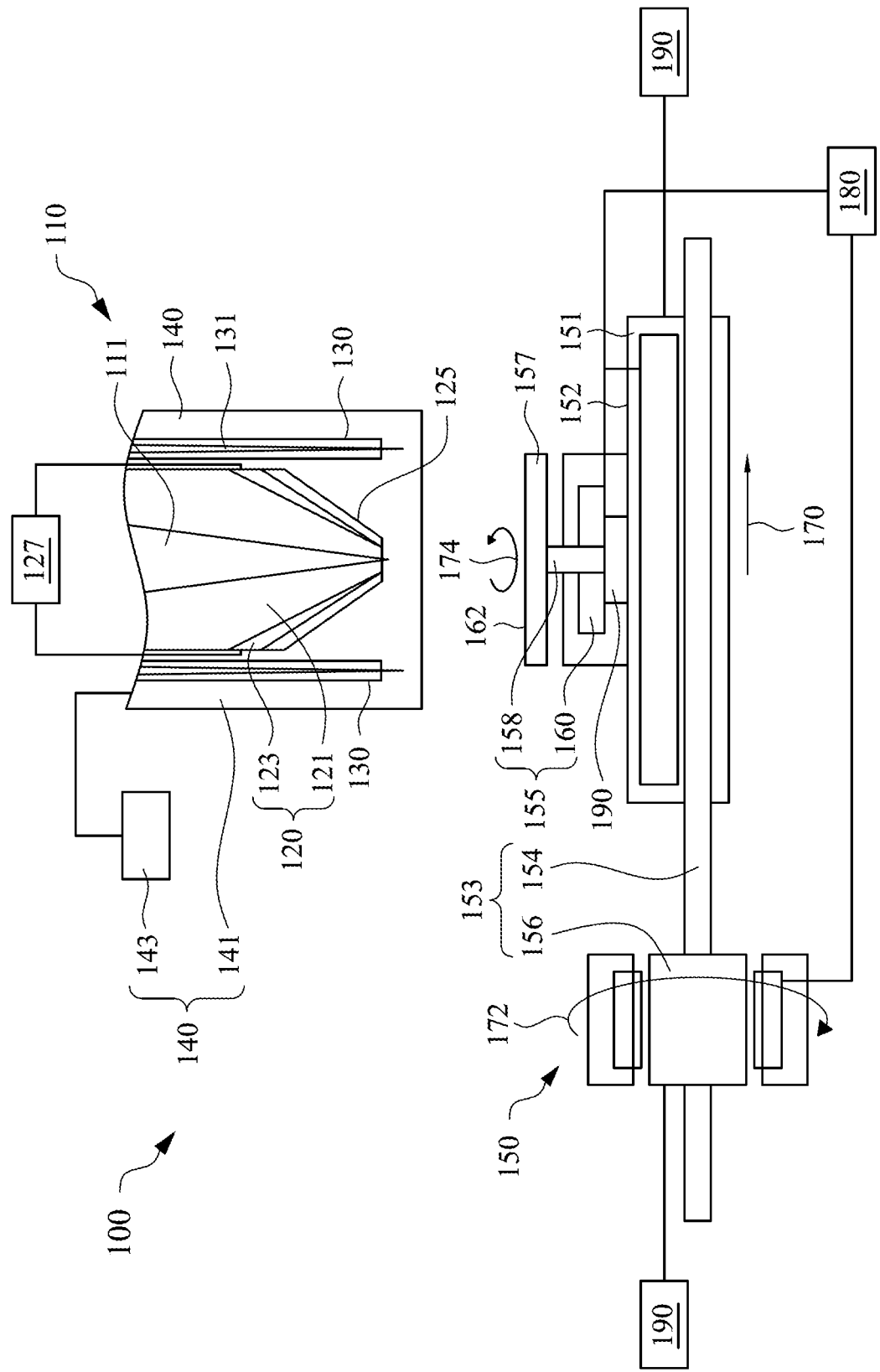
FIG. 1 is a schematic sectional view of an apparatus for manufacturing a dental restoration in accordance with some embodiments of the present invention.

Please refer to FIG. 1 first. FIG. 1 is a schematic sectional view of an apparatus 100 for manufacturing a dental restoration in accordance with some embodiments of the present invention. As shown in FIG. 1, the apparatus 100 for manufacturing the dental restoration (not shown) includes a first laser module 110, a powder supplying nozzle 120, a second laser module 130, a dust cleaning device 140 and an air bearing device 150 for holding the dental restoration. The first laser module 110 includes a first laser source 111. The powder supplying nozzle 120 includes a channel 121 and at least one powder injection passage 123. The channel 121 vertically penetrates the powder supplying nozzle 120, in which the channel 121 is configured such that a laser beam emitted by the first laser source 111 passes through the channel 121. The at least one powder injection passage 123 is disposed on one side of the channel 121. Furthermore, the first laser source 111 is disposed in the powder supplying nozzle 120, and is adjacent to the at least one powder injection passage 123. In some embodiments, the powder injection passage 123 is connected to a powder supplying device 127. In some examples, the powder supplying device 127 may further include a powder mixer and a gas flow device, so as to provide the powder of the dental restoration for performing a process of laser machining the dental model. In some embodiments, the powder of the dental restoration may include, for example, cobalt-chromium alloy.

In some examples, though not illustrated in FIG. 1, the first laser module 110 may further include an optical lens, such as a focus lens, a protective lens or the like, disposed in the channel 121 of the powder supplying nozzle 120, and the lens may be used with the first laser source 111. In some other examples, the powder supplying nozzle 120 may also include at least one compressed air passage (not shown) for introducing a protective gas such as argon. A person having an ordinary skill in the art can understand a detailed configuration of the first laser module 110, and the schematic configuration of the first laser module 110 shown in the present invention is used for clarification, and it does not intend to limit the scope of the present invention.

A second laser module 130 includes plural second laser sources 131, in which the second laser sources 131 is disposed circumferentially around an outer sidewall 125 of the powder supplying nozzle 120, and each of the second laser sources 131 is equally spaced apart from one another. In one example, the second laser sources 131 disposed circumferentially around the outer sidewall 125 of the powder supplying nozzle 120 are separated from the powder supplying nozzle 120 by a distance. In some other examples, the second laser sources 131 are directly fixed on the outer sidewall 125 of the powder supplying nozzle 120. The distance between the second laser sources 131 and the outer sidewall 125 of the powder supplying nozzle 120 may be defined according to an area in which the powder of the dental restoration injected from the powder injection passage 123 may spatter, and the distance is not limited to any particular numerical value in the present invention. In some embodiments, the second laser module 130 may also include an optical lens (not shown) such as the focus lens, the protective lens or the like.

In some embodiments, a power of the first laser source 111 is greater than a power of the second laser sources 131. In some other embodiments, the first laser source 111 and the second laser sources 131 may include, for example, a fiber laser, a diode laser or the like. Because the first laser source 111 is used in both the laser cladding process and the laser milling laser, in addition to being capable of melting the powder of the dental restoration, the first laser source 111 should also have sufficient power to mill the dental model. In contrast, the power of the second laser sources 131 can be relatively small because the second laser sources 131 is basically applied in the laser cladding process, in which the second laser sources 131 may merely melt and solidify the remaining powder of the dental restoration that cannot be melted by the first laser source 131 in time.

The dust cleaning device 140 includes a suction hood 141 and evacuation device 143, in which the first laser module 110, the powder supplying nozzle 120 and the second laser module 130 are disposed in the suction hood 141, and the evacuation device 143 is connected to the suction hood 141. In some embodiments, the evacuation device 143 may be a merchant suction pump, for example, an oil-free vacuum pump.

Figure 2:
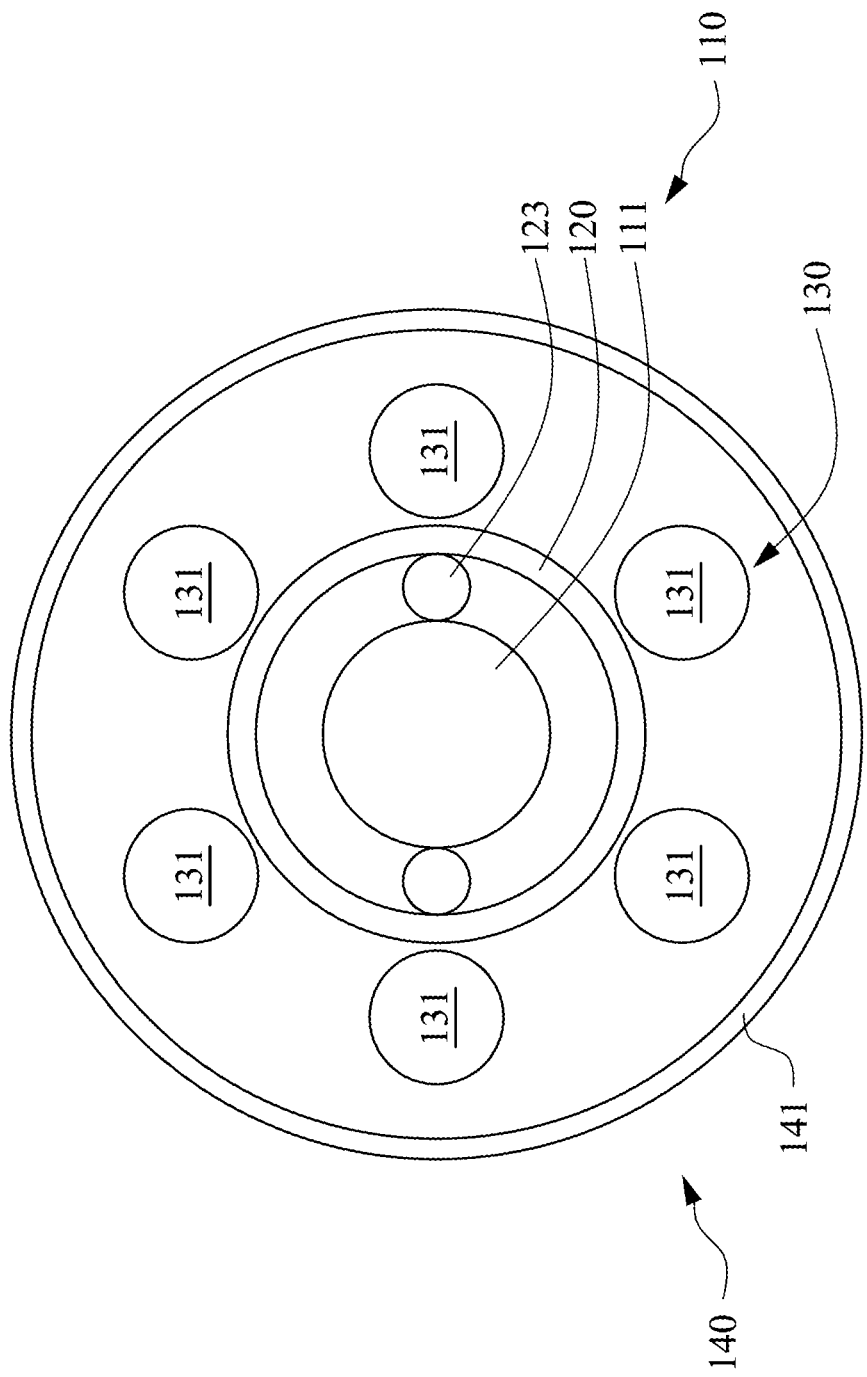
FIG. 2 is a top view of a first laser module, a powder injection nozzle, a second laser module and a dust cleaning device in accordance with some embodiments of the present invention.

Please refer to FIG. 2. FIG. 2 is a top view of the first laser module 110, the powder injection nozzle 120, the second laser module 130 and the dust cleaning device 140 in accordance with some embodiments of the present invention. Plural second laser sources 131 are disposed circumferentially around the powder supply nozzle 120 in which each second laser source 131 is equally spaced apart from one another. The second laser sources encircle the first laser source 111. It is noted that the number of the second laser sources 131 is not limited to any particular numerical value, and the number disclosed herein is merely for clarification. The number of the second laser sources 131 is determined by a dimension of the powder supplying nozzle 120, the area that the powder of the dental restoration may spatter or other process or device factors. In addition, as shown in FIG. 2, two gas injection passages 123 are symmetrically disposed on two sides of the first laser source 111 and adjacent to the first laser source 111. However, there is no particular configuration or number of the powder injection passage 123, and those may be adjusted according to the requirements of the process. The suction hood 141 of the dust cleaning device 140 may cover both the first laser module 110 and the second laser module 130, such that the removed material of the dental model can be sucked out (or cleaned out), thereby preventing the material from remaining in the apparatus 100 for manufacturing the dental restoration (e.g. remaining in the air bearing device 150). Therefore, the process may not be interrupted (e.g. the air bearing device 150 is likely to be damaged because of the material stuck therein).

Please refer to FIG. 1 again. The air bearing device 150 includes a linear motion platform 151 having a first surface 152, a first rotary element 153, a second rotary element 155, a platform 157 for holding the dental restoration, a gas supplying device 180 and a driving device 190. The first rotary element 153 includes a first rotary shaft 154 and a first rotary shaft bearing 156, in which the first rotary shaft 154 is connected to the linear motion platform 151. The first surface 152 is parallel to an extending direction 170 of the first rotary shaft 154 (i.e. a linear motion direction of the linear motion platform 151). The first rotary shaft 154 extends through the first rotary shaft bearing 156. In some embodiments, the first rotary element 153 rotates along a first rotational direction 172.

The second rotary element 155 includes a second rotary shaft 158 and a second rotary shaft bearing 160, in which the second rotary shaft 158 is disposed on the first surface 152 of the linear motion platform 151. The second rotary shaft 158 extends through the second rotary shaft bearing 160. In one embodiment, the second rotary element 155 rotates along a second rotational direction 174. The platform 157 for holding the dental restoration is disposed on the second rotary element 155. The platform 157 includes a second surface 162, and the second surface 162 is parallel to the extending direction 170. The gas supplying device 180 is connected to linear motion platform 151, the first rotary shaft bearing 156 and the second rotary shaft bearing 160, so as to provide the gas for supporting the dental model. The driving device 190 is respectively connected to the liner motion platform 151, the first rotary shaft bearing 156 and the second rotary shaft bearing 160, so as to drive the air bearing device 150 to undergo a rotational motion along the first rotational direction 172 and/or the second rotational direction 174, and/or undergo a linear motion along the extending direction 170.

As shown in the embodiment of FIG. 1, the dental model and the laser modules (include the first laser module 110, the powder supplying nozzle 120, the second laser module 130, the dust cleaning device 140 and the like) are vertically arranged. That is, the dental model is arranged under the laser modules. However, in some other embodiments, the dental model and the laser modules may be horizontally arranged. That is, the laser modules may be arranged on one side of the dental model.

In some embodiments, the apparatus 100 may be further coupled to a computer including a calculating unit, a processor coupled to a memory, or the like, so as to access profile information of the dental restoration to be manufactured. Furthermore, the computer may be coupled to a three-dimensional (3D) scanner. The profile information of the dental restoration to be manufactured may be obtained by scanning a tooth using the 3D scanner to obtain its profile information (i.e. the profile information of the dental restoration), followed by transferring the profile information to the computer for data processing. In some embodiments, the apparatus 100 and the 3D scanner and/or the computer may be arranged in the same space or different spaces, and the present invention is not limited to any specific arrangement of those devices. In one embodiment, the computer can further determine various parameters of the first laser source 111 and the second laser source 131. A person having an ordinary skill in the art can understand details about the coupling of the 3D scanner, the computer and the apparatus 100, and may not be further described herein.

It is noted that embodiments of the present invention shows the application of the apparatus 100 to manufacturing the dental restoration. However, the concepts that two processes can be performed in the same device and the problems tackled by the device can be further applied to other fields such as a medical industry, precision machinery, an aerospace industry, an automobile industry and a commodity industry. For example, the device is applicable to processing various materials such as titanium alloy, polymer, stainless steel (mold steel), tantalum alloy or zirconium oxide.

Figure 3:
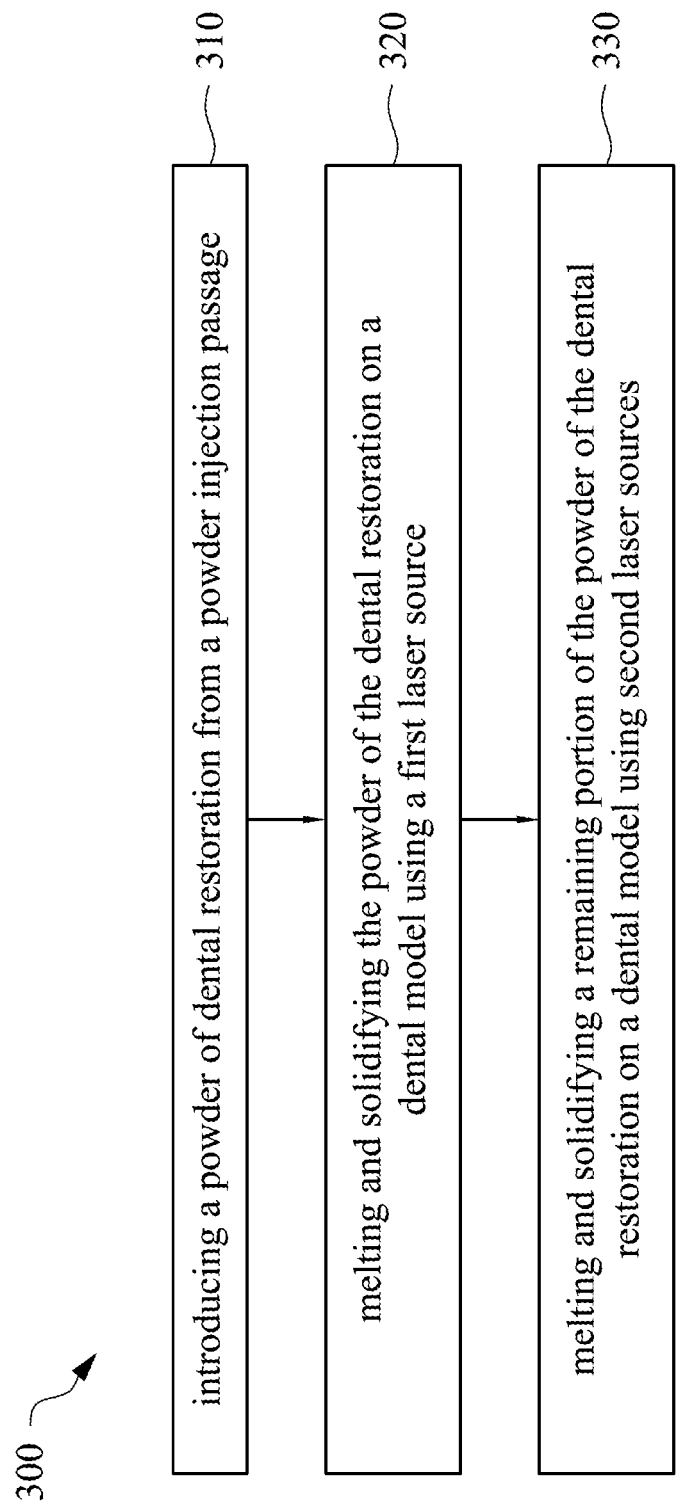
FIG. 3 is a flow chart showing a laser cladding process in accordance with some embodiments of the present invention.

Reference is made to FIG. 3 and FIG. 4 to describe a method of manufacturing the dental restoration using the device. It is noted that before the process shown in FIG. 3 and FIG. 4, the method further includes operations such as obtaining the profile information of the dental restoration to be manufactured using the 3D scanner, transferring the profile information to the computer for data processing, and the like.

FIG. 3 is a flow chart showing a laser cladding process 300 in accordance with some embodiments of the present invention. In the method, a dental model is provided on the platform 157 of the apparatus 100. Next, the laser machining process is performed according to the profile information of the dental restoration transferred to the computer. As shown in step 310 of FIG. 3, when the laser cladding process 300 is performed, dental restoration powder is introduced from the powder injection passage 123. Next, as shown in step 320, most portion of the dental restoration powder is melted and solidified on the dental model using the first laser source 111. Because the dental restoration powder is introduced by injection the dental restoration powder from the powder injection passage 123, the dental restoration powder may easily spatter. The second laser sources 131 are used to melt the spattered powder and solidify the spattered powder on the dental model, as shown in step 330.

The dental restoration powder that spatters out of the apparatus may be reduced by using the apparatus for manufacturing the dental restoration to perform the laser cladding process. Therefore, the dental restoration can be efficiently used, and the work of the platform will not be interrupted because the dental restoration powder is less likely to be stuck in the air bearing device 150. In addition, the whole process can be performed without using oil and water because cutting oil and water are not required in the laser cladding process. The process also has advantages such as rapidness and less noise because the process is performed using the air bearing device 150. Accordingly, the process can be directly performed in a dental clinic to manufacture the dental restoration because of the cleanness and the reduced pollution of the process. Therefore, a drawback of the known method can be improved, and the patient does not have to visit the dental clinic for treatment several times.

FIG. 4 is a flow chart showing a laser milling process 400 in accordance with some embodiments of the present disclosure. In the method, the dental model is provided on the platform 157 of the apparatus 100. Next, the dental model is processed using the laser according to the profile information of the dental restoration transferred to the computer. As shown in step 410 of FIG. 4, performing the laser machining process on the dental model. The laser machining process (e.g. the laser milling process) includes removing a portion of the dental model using the first laser source 111. Next, as shown in step 420, the portion of the dental model is cleaned out using the dust cleaning device 140. In some embodiments, when the laser milling process 400 is performed, the method further includes turning off the second laser sources 131. If the second laser sources 131 were not turned off, the energy of the second laser sources 131 might be wasted.

The dust cleaning device 140 can clean the dental model out by sucking the removed portion of the dental model out of the apparatus 100 during the process, so as to prevent the removed portion of the dental model from being stuck in the air bearing device 150. Therefore, the work of the air bearing device 150 will not be interrupted.

In some embodiments, both the laser cladding process 300 of FIG. 3 and the laser milling process 400 of FIG. 4 may include moving or rotating the dental model when the processes are performed. Specifically, the moving or the rotating of the platform 157 can be determined by the profile information of the dental restoration to be manufactured, in which the computer is coupled to the apparatus 100 for manufacturing the dental restoration.

Applying the device and the method for manufacturing the dental restoration of the present invention, the same device can optionally perform the laser cladding process or the laser milling process. When the device is used to perform the laser cladding process, the dental restoration powder that spatters out of the apparatus can be reduced, and the dental restoration powder can be efficiently used. Oil and water are not required in the process, and the process also has advantages such as rapidness and less noise, such that the process is suitable for manufacturing the dental restoration in the dental clinic. When the device is used to perform the laser milling process, the spattering of the removed portion of the dental model can be reduced, such that the work of the air bearing device may not be interrupted.

Although the present invention has been described in considerable detail with reference to certain embodiments thereof, other embodiments are possible. Therefore, the spirit and scope of the appended claims should not be limited to the description of the embodiments contained herein. In view of the foregoing, it is intended that the present invention cover modifications and variations of this invention provided they fall within the scope of the following claims.

What is claimed is:

1. An apparatus for manufacturing dental restoration, comprising:
    a first laser module, comprising a first laser source;
    a powder supplying nozzle, comprising a channel and at least one powder injection passage both of which are disposed in the powder supplying nozzle, wherein the at least one powder injection passage is adjacent to the channel, and the channel is configured such that a laser beam emitted by the first laser source passes through the channel;
    a second laser module, comprising a plurality of second laser sources disposed circumferentially around an outer sidewall of the powder supplying nozzle, wherein each second laser source is equally spaced apart from one another;
    a dust cleaning device, comprising:
        a dust suction hood where the first laser module, the powder supplying nozzle and the second laser module are disposed; and
        an evacuation device connected to the dust suction hood; and
    an air bearing device for holding a dental restoration, wherein the first laser module and the second laser module are disposed over the air bearing device.

2. The apparatus of claim 1, wherein the air bearing device comprises:
    a linear motion platform having a first surface;
    a first rotary element, comprising a first rotary shaft and a first rotary shaft bearing, wherein the first rotary shaft is connected to the linear motion platform, the first surface is parallel to an extending direction of the first rotary shaft, and the first rotary shaft extends through the first rotary shaft bearing;
    a second rotary element, comprising a second rotary shaft and a second rotary shaft bearing, wherein the second rotary shaft is disposed on the first surface of the linear motion platform, and the second rotary shaft extends through the second rotary shaft bearing;
    a platform for holding the dental restoration, wherein the platform is disposed on the second rotary element, the platform comprises a second surface, and the second surface is parallel to the extending direction;

a gas supplying device connected to the linear motion platform, the first rotary shaft bearing and the second rotary shaft bearing; and a driving device connected to the liner motion platform, the first rotary shaft bearing and the second rotary shaft bearing, so as to drive the air bearing device to undergo a rotational motion and/or a linear motion.

3. The apparatus of claim 1, wherein the powder injection passage is connected to a powder supplying device.

4. The apparatus of claim 1, wherein a power of the first laser source is greater than a power of the second laser sources.

* * * * *